(12) United States Patent
Chien

(10) Patent No.: US 6,976,762 B2
(45) Date of Patent: Dec. 20, 2005

(54) TUBULAR ELECTRO-LUMINESCENT LIGHT DEVICE

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 60 days.

(21) Appl. No.: 10/286,871

(22) Filed: Nov. 4, 2002

(65) Prior Publication Data
US 2003/0231487 A1 Dec. 18, 2003

Related U.S. Application Data

(63) Continuation-in-part of application No. 10/170,584, filed on Jun. 14, 2002, now abandoned.

(51) Int. Cl.$^7$ ............................................. G01D 11/28
(52) U.S. Cl. ..................... 362/84; 362/369; 362/390; 313/512; 313/511
(58) Field of Search ..................... 362/84, 390, 369; 313/511, 512, 509, 503

(56) References Cited

U.S. PATENT DOCUMENTS

| | | | | |
|---|---|---|---|---|
| 5,164,799 A | * | 11/1992 | Uno | 313/509 |
| 5,711,594 A | * | 1/1998 | Hay | 362/84 |
| 5,871,269 A | * | 2/1999 | Chien | 362/474 |
| 5,967,095 A | * | 10/1999 | Greves | 119/795 |
| 6,639,355 B1 | * | 10/2003 | Pennaz et al. | 313/498 |

* cited by examiner

*Primary Examiner*—Sandra O'Shea
*Assistant Examiner*—Anabel Ton
(74) *Attorney, Agent, or Firm*—Bacon & Thomas, PLLC

(57) ABSTRACT

A tubular Electro-Luminescent panel(s) light device offers superior bending characteristics with super brightness by integrating a predetermined width of panel with a proper circuit system. The panel(s) have narrow width to fit within tube means while enabling the panel(s) to be bent in any direction and angle because the panel(s) may freely move within the tube. The said panel(s) can be twisted within the tube means, and the tube means may have a desired colored, transparency, coil number, density, wall thickness, diameter, shape, and length, and be designed so that the light beam can be visible 0–360 degrees around the tube. The device may be incorporated with non-elastic means, magnetic means, a tube holder, inner tube(s), outer tube(s), conductive bus means, sensor means, and integrated circuitry to add a lot of desired features.

20 Claims, 5 Drawing Sheets

Fig. 6

TUBULAR ELECTRO-LUMINESCENT LIGHT DEVICE

This is application is a continuation-in-part of U.S. patent application Ser. No. 10/170,584, filed Jun. 14, 2002 now abandoned.

BACKGROUND OF THE INVENTION

The current invention is a tubular light device with an inner tube member that can protect the twisted EL elements from any damage. Also, (1) The EL element can have different colors for different light taste.
(2) The EL element(s) are installed on an inner tube which can deliver electric signals.
(3) The inner tube can be a non-elastic member for protecting the EL elements.
(4) The inner tube can include electric wires, conductive means, or FPC to deliver signals.
(5) The inner tube can be any size, thickness, diameter, shape, or material, as desired.
(6) The EL element can have different colors to indicate location, length, width for different light effects.
(7) The conductive means of the inner tube can serve as a bus means to allow signal delivery to multiple elements for a desired length.
(8) The incorporated bus means can include means to connect multiple elements to the bus means.
(9) The EL elements can overcome the EL panel's limitation for Minimum Bending Radius by using a super thin substrate of PET material and a laminated layer to reduce peel off strength.
(10) The EL elements have a rivet terminal, which is considered to be incorporated with the tubular EL so that it can easily be passed though the outside tube means to allow easy installation during assembly of products.
(11) The EL elements have inner conductive means which offer less resistance to deliver electricity having a certain voltage and frequency so so as to provide even brightness and color along the extremely long length of the tubular light means.
(12) The EL elements have BOLT silver paste, or conductive means, at the most easily damaged areas so as to allow the EL panel(s) to be twisted into a very tiny bending radius without damaging the EL material, including the ITO phosphor, isolating, and dielectric layers.
(13) The EL elements may further incorporate waterproofing using a most simple method at lower cost by isolating the common electrode from other EL electrodes connected with signal ends to enable some light performance.
(14) The EL elements have at least one inner tube by at least one conductive wire/device to hook the EL material, electrode material, conductive means, phosphor, and silver paste.
(15) The EL elements may apply etching techniques to remove all EL material and only have conductive means such as a silver paste coating so as to prevent short circuits caused by water, humidity, etc.
(16) The EL elements can be connected with signal ends over a large distance even when using the standard terminal stamping procedure.

Tubular shape Electroluminescent (EL) light devices are disclosed in U.S. Pat. No. 5,485,355 Voskoboinik et al., U.S. Pat. No. 5,753,381 Feldman et al., and U.S. Pat. No. 5,711,594 Hay, but the tubular devices disclosed in these references have a number of limitations, including the disadvantages that they are too expensive and too slow to produce, too limited in brightness, too difficult to to appy etc.

U.S. Pat. No. 5,711,594 Hay disclsoes a Tubular EL Lamp which includes strips within a glass tube and a glass fiber between the light emitting surface and the tube to gather light from the strip. Also, the tube is an optical element. Such an optical tube is not flexible, does not permit viewing of the light from 0–360 degree, is not available for bending into any shape, does not protect the EL strips, cannot generate linear light over a soft and curved surface, does not provide a colorful light arrangement, is not subject to bending and fixing of the shape, is not stitchable and cannot be glued on a main object surface, and cannot have unlimited length or by joined with other strips for a desired length with the same function.

U.S. Pat. No. 5,893,629 Gubernick discloses a phosphorescent tube with which offers light beams in a dark environment.

U.S. Pat. No. 6,190,027 Lekson teaches a running board with illumination which includes an electroluminescent element within a transparent tube and one optical element position in front in the light emitting direction. This arrangement is essentially the same as that disclosed in the Hay patent. Lekson uses a small EL panel to get the light out to the viewer, who must have to have one optical member to focus the light and provide strength. Lekson does not provide for 0–360 light emission, a method to make a desired length, flexible and bendable features for tube light, a protect member inside and on the back of in a light emitting direction, use of the conductive means of the bus to build unlimited length, a method to overcome the mimimum bending radius for EL strips, or stitching or gluing to a main object surface, The current invention use a low-cost panel type of electro-uminescent element sealed within the inside of the tube shape to provide a substantially lower cost, a simple production procedure, super brightness, and the ability to easily make the lighting element have any diameter.

1. The current invention provides a way to make any diameter of tubular EL light device by a simple process.
2. The current invention provides a way to prevent a sharp-angle while bending the plastic tube.
3. The current invention provides a colored plastic tube as a cosmetic purpose for a tubular EL light device.
4. The current invention teach a proper wall thickness for the plastic tube to overcome some bending problems.
5. The current invention provides a way to make an extended Electro-Luminescent panel having an unlimited length.
6. The current invention provides a way to make a multiple colors tubular light device for desired effects.
7. The current invention provides a way to make a tubular EL light device with optical features and properties.
8. The current invention provides a way to have a super brightness tubular EL light device.
9. The current invention provides a way to have a tubular EL light device with any desired bend and fixed shape.
10. The current invention provides a way to have a tubular EL light device with twisted panel(s)

11. The current invention provides a way to have a tubular EL light device that resembles a Neon light by placing panels back to back.
12. The current invention provides a way to have a tubular EL light device for any bending angle by twisted panel(s).
13. The current invention provides a way to have a flat tubular EL light with twisted panel(s) for a weaving effect.
14. The current invention provides a way to have a Magnetic Means incorporated with the tubular EL light device.
15. The current invention enables a tubular light device to be used in joint areas of main objects, such as a tool box or automobile/truck door.
16. The current invention provides a mixed color for twisted EL panels to improve the cosmetic appearance.
17. The current invention provides a variety of applications to different categories of illumination.

The current invention improves upon the above listed US prior art because it is simple to make all kinds of tube shapes with a desired diameter. Also, The brightness can be designed for any brightness requirement without investment in machinery because the marketplace already has available machines that can provide tubes having a lower cost and the ability to quickly make big quantities and provide people with a good lighting device at lower cost and increased safety.

The current invention also offers a Bend-N-Shape featurews as described in a co-pending US patent application, which offers great performance as a working lamp to provide desired illumination for certain work environments.

The current invention also offer a twisted EL panel(s) arrangement for consumer application to items such as a Shoe, Slide, Slipper, Sandal, Automobile, Boat, Bus, Aircraft, Garden, Traffic equipment, Bag, Purse, House, Building, Christmas, Seasonal Item, Bicycle, Tricycle, Toy, Moving Device, Skating or Jogging equipment, Watch, Garment, Clothing, Jeans, Box, Tool Box, Working Lamp, Furniture, Giftwear, Headgear, Jewelry, Hair Accessories, Partywear, Sign, Indoor lighting, Outdoor lighting, Street lamp, Guide lamp, Bridge lamp, Traffic cone, New Jersey Deck, Fence, Mail Box, House Number light, Window Sign, Wall Sign, Poster, Passway, Stair, Curb, Line divider for queues, Evacuation light, Fishing Marker, Decoration device for Safety, Decoration, Advertisement, Promotion, Point-Of-Purchase display, Warning light, Accent light, illumination light, Floor light, Delineator guide light, and Evacuation light, which can be found from market place with other light means such as an L.E.D., incandescent light bulb, fluorescent tube, Neon tube etc. The current invention preferably can use an EL light with sufficient light brightness with very low power consumption, as described in the current Inventor's variety of U.S. issued patents including U.S. Pat. Nos. 5,746,501, 5,980,060, 5,722,760, 5,504,397, 5,475,574, 5,479,325, 5,570,946, 5,469,342, 5,570,945, 5,704,705, 5,611,621, 5,860,727, 5,865,523, 5,879,069, 5,572,817, 5,752,337, 5,794,366, 5,833,508, 5,688,038, 5,871,269, 5,720,651, 5,806,960, 5,947,980, 5,775,016, 5,566,384, 5,876,108, 5,836,671, 5,601,358, 5,754,064, 5,921,653, 5,667,394, 6,082,867, 6,170,958, 6,183,101, 6,171,117, 5,926,440, 6,158,868, 6,182,282, 6,179,431, 5,599,088, 5,213,616, 6,179,431, 6,280,053, 6,170,958, 6,168,282, 5,926,440, 5,683,164, 6,183,101, 6,123,616, 6,280,053, 5,926,440, 5,754,064, 5,879,069 and other issued patents owned by the current inventor. The advantage of electro-luminescent lighting elements in a variety of contexts are explained in several co pending U.S. patent application include U.S. patent application Ser. Nos. 08/305,294; 08/343,404; 08/343,915; 08/383,404; 08/383,405; 08/409, 925; 08/421,647; 08/432,707; 08/438,373; 08/444,064; 08/436,007; 08/444,064; 08/489,160; 08/498,258; 08/510, 701; 08/522,940; 08/561,973; 08/611,049; 08/614,001; 08/522,940; 08/712,484; and 08/734,872, which cover more utilities for Electro-Luminescent elements. The light panels or elements listed above can be attached on any single radius surface without any problem. The current invention uses the "wider tube" space to install narrow EL panel(s), offering the extra space to allow panel(s) to be bent or twisted with any ugly shape that can not be seen by viewer. It also has several arrangements to make the tube look like a Neon tube or a pretty good cosmetic light arrangement. Other features resulting from use of a tube with panel(s) are that they can fit a Sphere-Surface which has more than one radius curvature and can fit pretty well without an ugly shape that would destroy the value of the light. Also, the method uses limited length EL panel(s) that can be connected to provide unlimited length panels as desired.

DETAILED DESCRIPTION OF THE PREFERRED EMBODIMENTS

The current invention includes electro-luminescent panel(s) provided with tube-means having a pre-designed wall thickness, color, transparency, and/or softness to the said panel(s) to follow the tube curvature and be attached to main objects. The improvement involves providing enough space to allow the panel(s) freely to move, change shape, bending, twisted within the tube so will be that the tube can easily be able to be attached to a surface with pretty Neon or Fluorescent tube light effects and a desired function.

The current invention also teaches how to offer a 0–360 degree viewing angle for light emitted out from the tube at super low cost and yet with a durable quality to prevent damage caused by an outside force or impact to the EL panel. The twisted EL panel has a desired density/space which offers extra room for the EL elements. The "free movement space" is the key to solving the "EL bending limitation". This spacing while twisted can offer a major solution applicable to all EL panel use to provide linear light sources. Also, because the twisted EL panel only has a single surface with light illumination, it will only have the cost of one strip but can get the 0–360 viewing angle with a light beam having excellent light effects available in the conventional market.

The current invention also offers an "inner tube" concept which can allow the tubular EL light device to have an unlimited length, and provide a Bend-N-Shape EL light tube, protection means to prevent damage, and magnetic means for installation on all metal surfaces, This linear light tubular device provides numerous benefits to the public and makes a tremendous improvement for EL panels by using two-dimensional or flat panels to provide three dimension light means. This is the main improvement for the current invention.

(1) Material Thickness to Reduce Peel Off Strength

Further, the current invention has been able to overcome several major problems and make a tubular element having a very tiny diameter by twisting the EL strips around a 0.5 mm diameter inner conductive wire. The current invention disclosure a special treatment in FIG. 1 to obtain EL strips which have a super thin substrate layer of PET. Normally EL material will use around 0.10–0.175 mm thickness for PET. The current invention selects the thinner PET to let the EL strips become much softer and especially easy to bend. Also, the laminated layer uses strict thickness criteria while selecting the material. These standards prevent the peel off strength of the PET and laminated layer from being too large due to the material thickness. While reducing the thickness of the PET and laminated layer, the peel off strength of the EL strips will be reduced to a workable level.

(2) Etching Process to Prevent Short Circuits and Cracking

The current tubular light device may be incorporated into a beach sandal and therefore may need to be fully waterproof. The current invention uses an etching process for the EL material, including the electric, dielectric, phosphor, and chemical layers to only leave a certain layer at a desired location to prevent moisture and electrical current from causing a short circuit. This process and consideration may or may not apply to each different application. However, if waterproof features are required, this is a good consideration.

(3) Bolt Silver Paste to Prevent Peel Off

Figure 1:
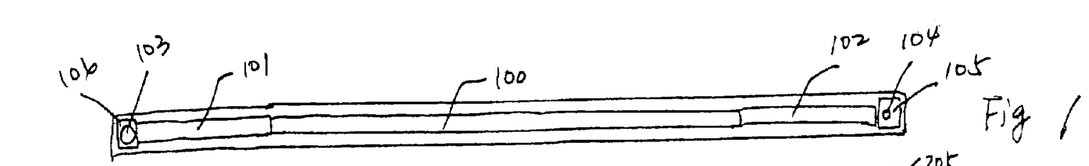
FIG. 1 shows a tubular EL light device with Special EL panel construction.

The other special treatment to overcome damage to the EL strips while making a small diameter twist involves ensuring that the critical areas will only have a single conductive layer coating, such as is illustrated in FIG. (1), areas(101) and (102), which are critical areas referred to as the START TWIST POINT and the END OF TWIST. These two area(s) have a large shape and radius change which is normally smaller than the EL panel minimum bending radius. Hence, these areas are very critical to make twist.This is accomplished by removing all other EL material by an etching process and only applying the conductive means, preferably using silver paste to establish an electrical connection. These areas not only have silver paste areas, but also need to be very large because they are used to peel off the substrate PET and laminated layer. Hence, the silver paste printed area should be made as big as possible to facilitate peel off and prevent cracking which would cause the EL panel to be damaged during this twisting procedure.

(4) The Special Terminal to Simplify Installation and Assembly

Figures 2, 3:
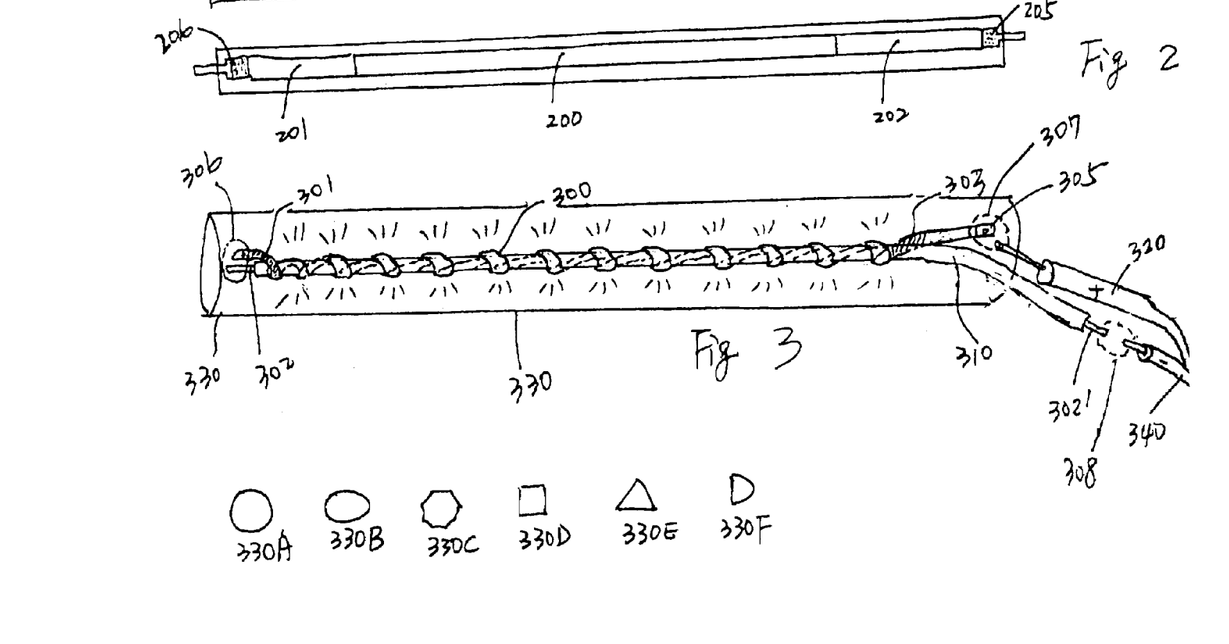
FIG. 2 shows a tubular EL light device with a Special EL panel in which the terminals are of alternative conventional type.
FIG. 3 shows a tubular EL light device having an EL panel with inner conductive inner tube and outside tube.

It is preferred to use a rivet terminal instead of the clamp claws of traditional conventional market type elements. Rivet terminals are smaller and have no sharp angle. If not available claw clamp terminals can be used as shown in FIG. 2 (206), although assembly and installation are made more difficult and less efficient.

(5) The Separate Electrodes to Reduce Short Circuit Hazard

Figure 4:
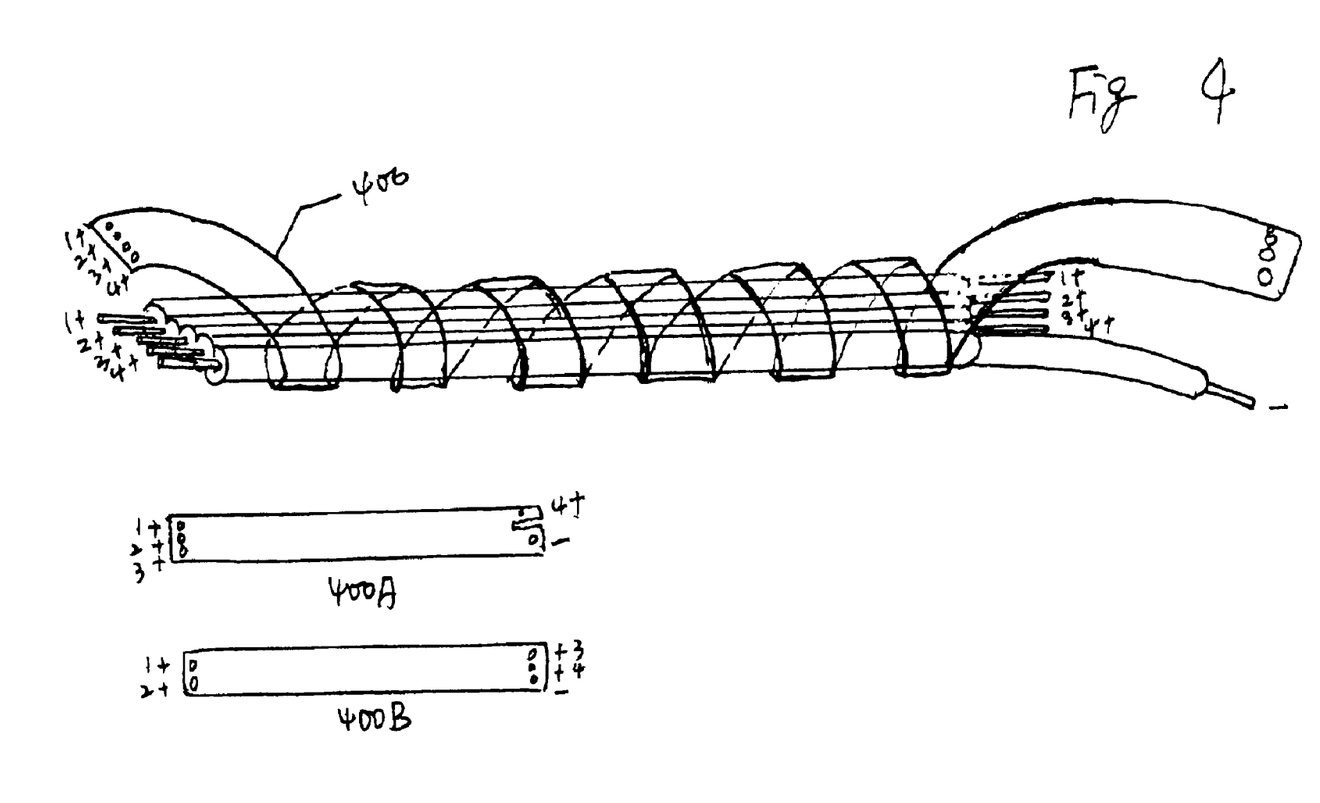
FIG. 4 Disclosure the EL Tubular light device with multiple color and strips for desired functions.

The traditional EL panel procedure uses a standard stamping procedure to add metal terminals on tiny areas such as the claw clamp terminal having a dimension of 2.54 mm for each terminal. Hence, the common electrode (normally an ITO layer) is side by side with all other EL phosphor areas' electrodes, within 2.54 mm or only several times the 2.54 mm distance. This will cause a very very dangerous electric shorting problem. To solve this problem, the current invention places the common electrode on one end of the EL strip and all other EL phosphor connected electrodes on the other end so this will prevent electric shorting caused by any water or humidity. The preferred electrodes can be divided by make a ditch or cut-out as shown in FIG. 4 (400A) on the (4+) and (−) location.

(6) Optics Properties Inner Tube to to Improve Appearance of the Light Tube

Figure 3A:
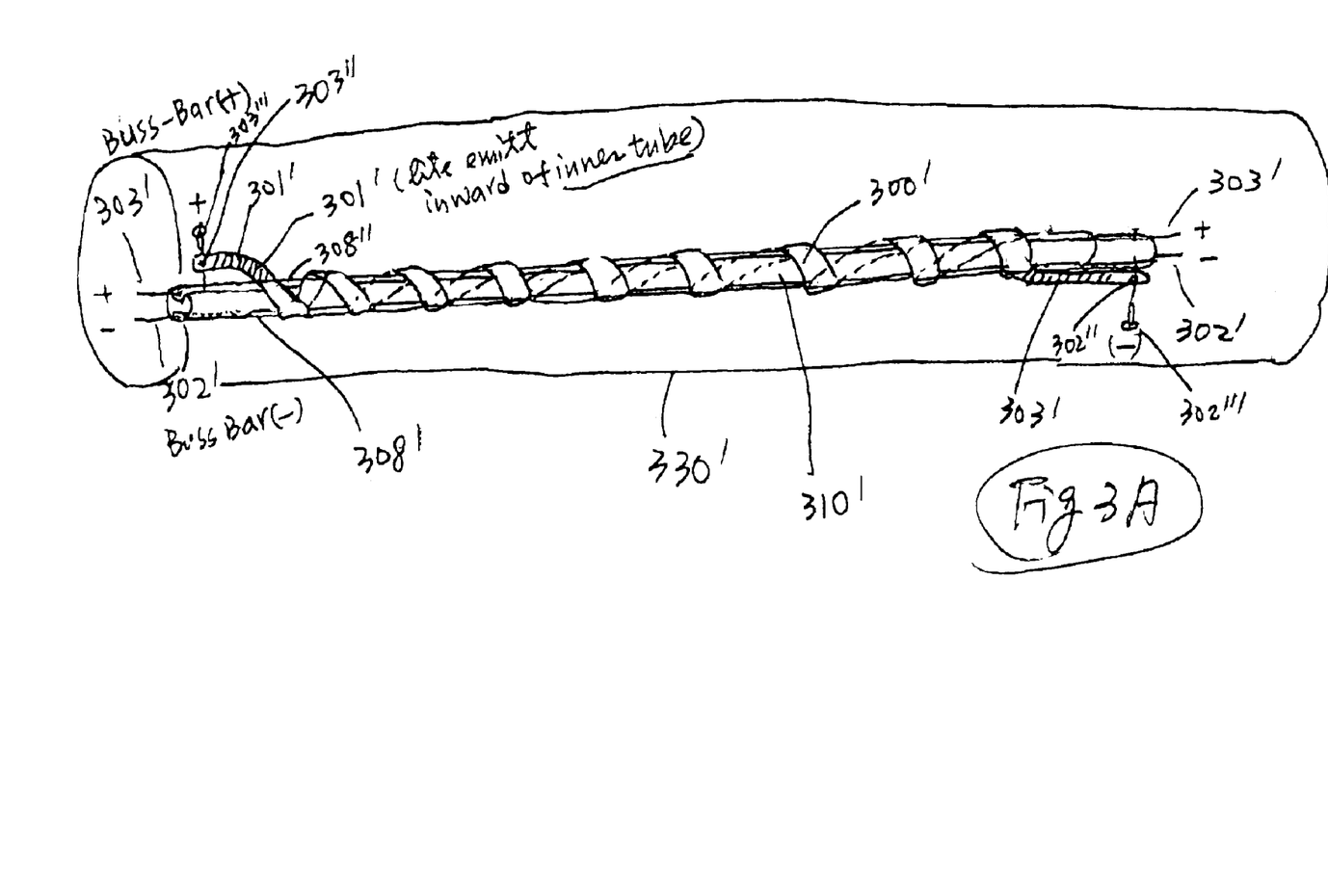
FIG. 3A shows a tubular EL light device including an EL panel with an inner tube having a predetermined transparency and optical properties.

An alternative EL panel arrangement includes an inner tube with a certain degree of clarity or transparency to allow light to pass though. The tube of this embodiment may also have a certain geometric shape and diameter, size, or dimension so as to exhibit certain properties according to optics theory. This will let the beams conform to user preferences. As shown in FIG. 3A, the EL panel (300') of this embodiment has a twisted shape arranged on the inner tube (310'), which includes a conductive means arrangement. Preferably, the conductive means is on an outer surface instead of the inner of tube so that the inner tube can be kept very clear inside with good light transmissive, reflective, retro-reflective, deflective, magnifying, focus change, image change or other conventional optics properties according to market requirements. The EL panel (300') is arranged to emit light due to the clarity/partial transparency of the inner tube so that light will be visible from the other side of inner tube. The inner tube may have conductive means on the outside surface groove or ditch (308') (308"). The conductive means (303') includes an electrode (302') to enable delivery of different electric signals to let the panel (300') to turn on with desired function and effects. Those skilled in the art will appreciate that the plurality of conductive means, groove, electrodes, may be varied without departing from the current invention scope, and are not limited to this preferred embodiments. The EL terminal (303''') ( 302''') uses conventional connect means including riveting, soldering, stamping, or glue, to connect the conductive means (303') (302') with EL terminals (303") (302") by pins (303''') (302'''). The connect means can be adapted from commercially available connectors, so a light device with a number of basic EL panels (300') will have same input voltage and frequency because the bus bar (303') (302') always has less resistance than the conductive means to carry electric signals by means of an electric wire.

From the above experiments and test, it can be seen that the current invention overcomes all major problems with respect to making a Twisted Tubular light device without any defect, and that may be applied to any conventional application including Footwear, Athletic device, Waning Light, Safety light, Garden Light, Skates, Evacuation Light, Outdoor Lighting, Indoor Lighting, Solar Power Light Device, Christmas Light Device, Above the water or under the water application.

As shown in FIG. 1, the current invention includes a Tubular EL light device with an elongate shape having EL material on the location 100. The EL material may be in the form of a conventional type phosphor, electric, dielectric, conductive, ITO, or silver paste layer, etc. The two critical area(s) 101,102 which are subject to rapid twisting and changes in shape only have the big areas of conductive material applied on these areas to overcome the peel off strength from PET substrate and laminated layer. Also, The big conductive material areas (101) (102) for this big area preferably utilize a material that can resist cracking, peel off, or scratching, so this is a very important procedure to reduce the damage rate while making EL strips to twist at these areas. Elements (104) (103) represent a preferred rivet terminal instead of the claw clamp stamped metal terminals depicted in FIG. 2 as elements (205) (206), which are have standard 6 mm claw areas to stamp on the EL panels and provide sufficient hold strength. This 6 mm long with 2 mm width makes it difficult to pass the tubular EL light device into the outside tube. However, the rivet terminal (103) (104) may have difficulty in holding onto the EL panel.Therefore, it is also possible to use a conductive sheet (105)(106) made of a material such as aluminum, brass, metal to allow the rivet to punch though while maintaining good tightness, help prevent soldering damage, and increase thickness or provide an adjustable thickness. All these optional variations depend on the requirements of the particular application, but this will be help to make a rivet with sufficient rigidity to adequately hold the EL material.

FIG. 3 shows a tubular EL light device having an outside tube (330) which has one single EL strip (300) inside. The light device coil light means emits out from the elongate outside tube with desired light performance. The inner tube (310) is a conductive electric wire with PVC skin to allow the EL panel have a cushion to provide impact strength and prevent damage. The inner conductive tube also offers a super low resistance conductive channel to delivery the signal at the same voltage and frequency. The inner tube may selected to have a diameter as small as 0.5 mm up to any desired diameter depending on the marketing requirement. The Inner tube also can have multiple conductive wires to hook with multiple EL phosphor areas to provide a desired light function as shown in FIG. 4. The EL panel(300) includes etched EL material on the two critical areas ( 301) and (303) to allow any kind of rigid twist process to be used without damaging the EL panel damaged. The EL panel (300) has two rivet terminals ( 306) and (307) on two ends and soldered with the inner tube electrode (302) and the signal end (320). These two separated EL phosphor electrodes and common negative electrode will offer the best water proofing and short circuit prevention properties. Moreover, designs can be varied according to marketing requirements, as shown in FIG. 4 by adding insulation elements (400A) (400B) in the form of a groove, ditch, cut-out, tape-out made by any conventional method. The current invention preferably adheres to a strict waterproofing requirement.

The EL panels (300) include two electrodes (306) soldered to an inner wire electrode (302) to make electricity delivery to one end (302') and to connect with the signal negative end (−). The other EL panel (300) includes an electrode (303) connected with the signal Positive end (+) (320) to form the other electric supply. This can turn on the twisted EL light device (330). Due to the strict waterproof requirement, those skilled in the art may wish to separate the two connection points by a relatively large distance from each other to prevent water caused the damage. Alternatively, the terminal arrangement shown in FIG. 4, including terminals (400A) (400B) in the form of several EL positive electrodes and common negative electrodes (1−) can be positioned and arranged using a cut-out, tape out, ditch, groove, shrink tube sealing, hot-glue sealing etc.

Figure 6:
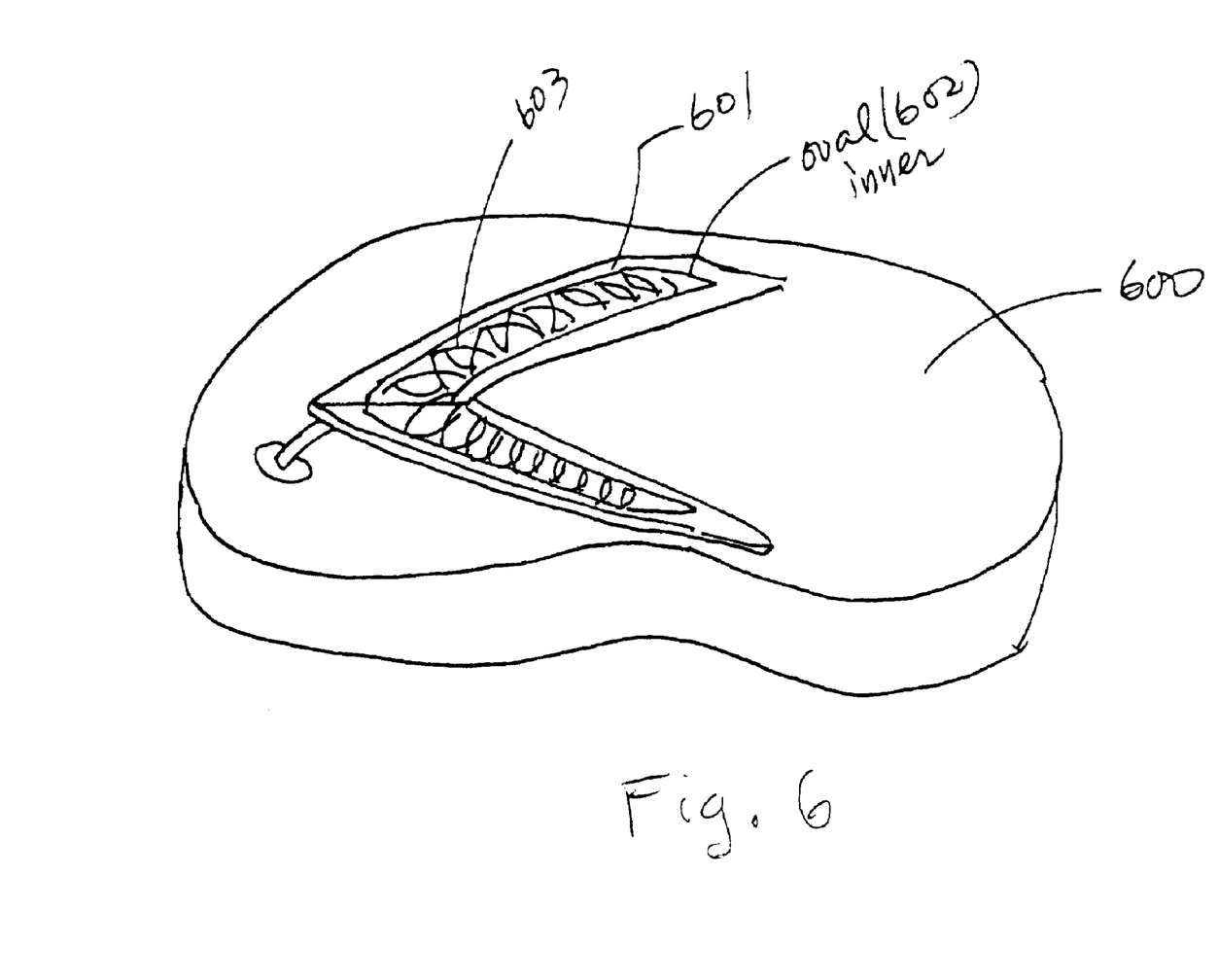

As shown in FIG. 3, inner tubes (330A) (330B) (330C) (330D) (330E) (330F) can have any shape and geometric design depending on the application. The same concept can apply to the outer tube or sleeve used to seal the tubular, twisted EL within. Similarly, as shown in FIG. 6, lighting element (600) can include and inner tube (602) having an oval shape with the the EL panel twisted on this oval (602) to and inside the outer tube, envelope, sleeve, or pack (601). This arrangement can be widely applied to all kinds of footwear including a sandal, slipper, athletic shoe, hiker and other kinds of footwear.

FIG. 4 shows multiple electrodes for EL phosphor areas (1+))(2+)(3+)(4+) and common (−). The EL panel inner conductive wire electrodes can be arranged in a variety of different alternative configurations based on marketing requirements.

Figure 5:
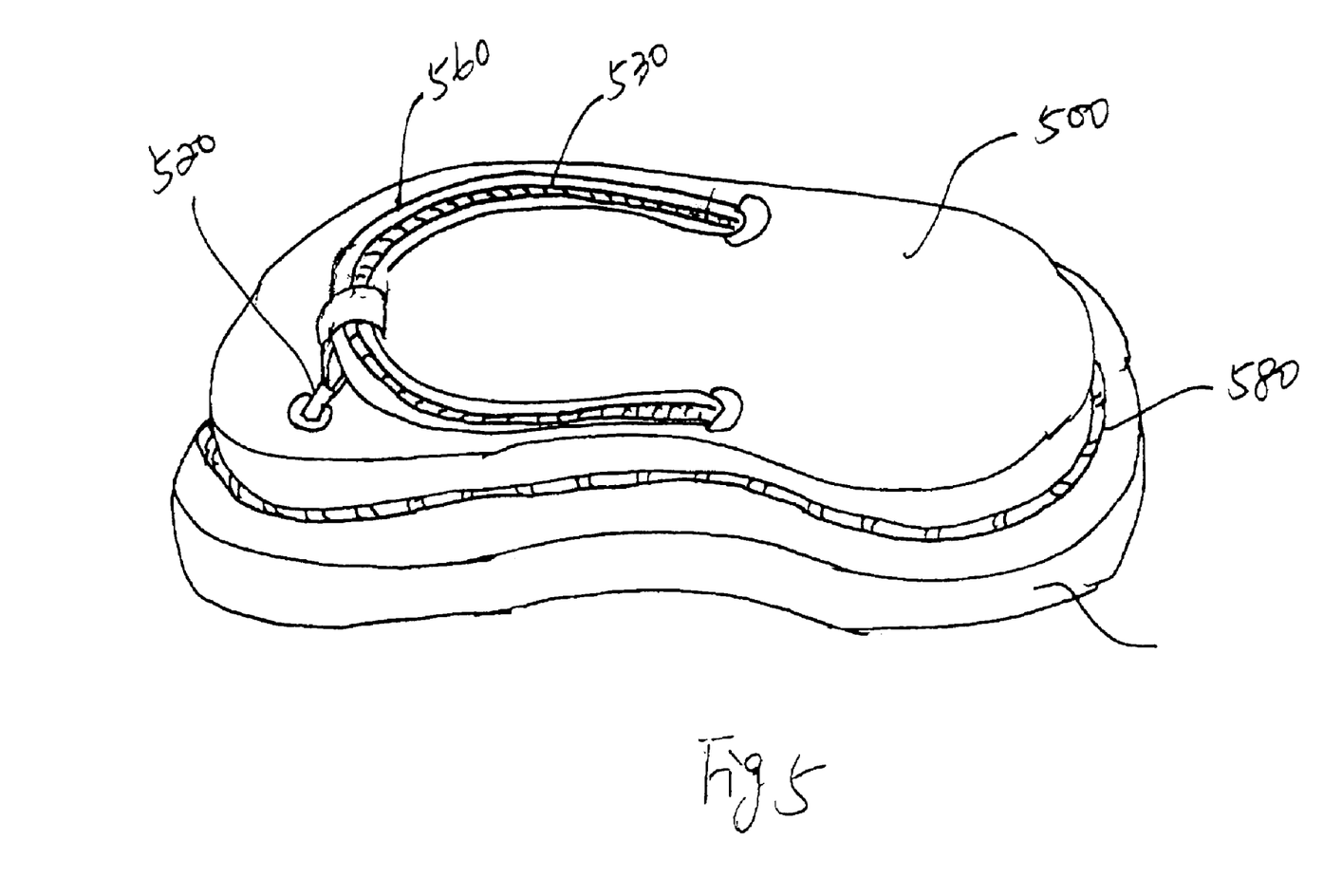
FIGS. 5 and 6 show applications of the EL Tubular light device.

FIG. 5 shows a simple example of a tubular EL light device for a beach sandal (500) application. This can also be incorporated in all kinds of footwear. As shown in FIG. 5, the upper strap is formed by a clear tube (560) which offers a space for a tubular EL light device (530) within and further offers double protection and comfort to the wearer. The Tubular EL light device (530) only has a less than 3 mm diameter range so as to save EL panel cost. The equivalent tubular EL (580) can be applied on other parts of the footwear, such as a ledge, without the need for an extra big tube.

FIG. 6 shows an alternative sandal with a flat outer tube (602) and oval inner tube (non-conductive cushion inner tube not shown) to allow EL panels (603) to be woven inside the outer oval tube and arranged on the Footwear.

Having thus described seveal preferred embodiments of the invention, it will be appreciated that variations and modifications of the preferred embodiments may be made without departing from the scope of the invention. It is accordingly intended that the invention not be limited by the above description or accompanying drawings, but that it be defined solely in accordance with the appended claims.

What is claimed is:

1. A tubular EL light device comprising:
   an inner member;
   at least one electro-luminescent (EL) panel including a substrate, at least one phosphor area on the substrate, and etched electrodes for connection to an electric power source by conductive means connected to the electrodes, said conductive means being connected to a signal means for causing said phosphor areas to emit light, and said panel having a predetermined width and length; and
   an outer member surrounding said EL panel and inner member to enable said light device to be attached to a main object,
   wherein said EL panel is wrapped around said inner member, said inner member providing cushioning for said EL panel, and wherein sufficient space is provided around the EL panel to permit bending of said EL panel and said EL light device.

2. A tubular EL light device as claimed in claim 1, wherein said electrodes comprise a conductive material formed on desired areas of said panel by a process of etching said conductive material.

3. A tubular EL light device as claimed in claim 1, further comprising terminals for connecting said electrodes to said electric power source.

4. A tubular EL light device as claimed in claim 3, wherein said terminals include claw terminals.

5. A tubular EL light device as claimed in claim 3, wherein said terminals comprise rivets.

6. A tubular EL light device as claimed in claim 5, wherein said rivets are punched through reinforcing conductive members.

7. A tubular EL light device as claimed in claim 3, wherein said electrodes include a common electrode spaced from other electrodes to prevent shorting.

8. A tubular EL light device as claimed in claim 3, wherein said panel includes multiple phosphor areas and multiple electrodes, and wherein said terminals comprise a plurality of individual terminals for respective connection to said multiple electrodes, and a common terminal connected to each of the electrodes.

9. A tubular EL light device as claimed in claim 1, wherein said substrate of said panel is made of PET with a thickness of less than 1.80 mm.

10. A tubular EL light device as claimed in claim 1, wherein said inner member is a conductive wire for connection to a signal terminal, and a cushioning material surrounding the conductive wire.

11. A tubular EL light device as claimed in claim 1, wherein said inner member encloses multiple conductive wires connected to multiple terminals of signal terminals to provide multiple lighting effects.

12. A tubular EL light device as claimed in claim 1, further comprising a non-elastic elongated member arranged to enable bending and fixing of the device in a desired shape.

13. A tubular EL light device as claimed in claim 12, wherein said elongated member is a metal wire.

14. A tubular EL light device as claimed in claim 1, wherein said outer member is a tube surrounding said inner tube and EL panel.

15. A tubular EL light device as claimed in claim 14, wherein said outer member is sealed to provide a waterproofing effect.

16. A tubular EL light device as claimed in claim 14, wherein said outer member is at least partially transparent, has a predetermined thickness, and is arranged to exhibit optical effects.

17. A tubular EL light device as claimed in claim 14, wherein said outer member has a flattened shape.

18. A tubular EL light device as claimed in claim 1, wherein said inner member is at least partially transparent.

19. A tubular EL light device as claimed in claim 1, wherein said EL panel is twisted around said inner tube according to a predetermined weaving pattern.

20. A tubular EL light device as claimed in claim 1, wherein said device is attached to a main object selected from the group consisting of footwear, garments, bags, vests, headgear, communications equipment and general commodities.

* * * * *